(12) United States Patent
Bose et al.

(10) Patent No.: US 8,296,773 B2
(45) Date of Patent: Oct. 23, 2012

(54) SYSTEMS AND METHODS FOR THREAD ASSIGNMENT AND CORE TURN-OFF FOR INTEGRATED CIRCUIT ENERGY EFFICIENCY AND HIGH-PERFORMANCE

(75) Inventors: Pradip Bose, Yorktown Heights, NY (US); Alper Buyuktosunoglu, White Plains, NY (US); Eren Kursun, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1150 days.

(21) Appl. No.: 12/164,775

(22) Filed: Jun. 30, 2008

(65) Prior Publication Data

US 2009/0328055 A1    Dec. 31, 2009

(51) Int. Cl.
G06F 9/46    (2006.01)
G06F 1/00    (2006.01)
(52) U.S. Cl. ......................... 718/105; 713/300
(58) Field of Classification Search ............ 718/105, 718/1, 104, 108; 713/310, 320, 321, 322, 713/323, 324; 714/10
See application file for complete search history.

(56) References Cited

U.S. PATENT DOCUMENTS

| 4,814,982 | A | * | 3/1989 | Weir | 711/164 |
| 7,730,365 | B1 | * | 6/2010 | Belady et al. | 714/47.1 |
| 2003/0115495 | A1 | * | 6/2003 | Rawson, III | 713/324 |
| 2005/0125556 | A1 | * | 6/2005 | Curran et al. | 709/238 |
| 2005/0188372 | A1 | * | 8/2005 | Inoue et al. | 718/100 |
| 2005/0210472 | A1 | * | 9/2005 | Accapadi et al. | 718/105 |
| 2005/0216222 | A1 | * | 9/2005 | Inoue | 702/136 |
| 2006/0095913 | A1 | | 5/2006 | Bodas et al. | |
| 2006/0112391 | A1 | | 5/2006 | Hernandez | |
| 2006/0190942 | A1 | * | 8/2006 | Inoue et al. | 718/100 |
| 2006/0212677 | A1 | * | 9/2006 | Fossum | 712/1 |
| 2007/0074011 | A1 | * | 3/2007 | Borkar et al. | 712/227 |
| 2008/0091974 | A1 | * | 4/2008 | Nakashima | 714/10 |
| 2008/0307244 | A1 | * | 12/2008 | Bertelsen et al. | 713/323 |
| 2009/0164812 | A1 | * | 6/2009 | Capps et al. | 713/320 |
| 2009/0249094 | A1 | * | 10/2009 | Marshall et al. | 713/320 |

FOREIGN PATENT DOCUMENTS

EP    1837762 A1    11/2007
JP    08-305761    11/1996

* cited by examiner

*Primary Examiner* — Thomas Lee
*Assistant Examiner* — Phil Nguyen
(74) *Attorney, Agent, or Firm* — Tutunjain & Bitetto, P.C.; William Stock

(57) ABSTRACT

A system and method for improving efficiency of a multi-core architecture includes, in accordance with a workload, determining a number of cores to shut down based upon a metric that combines parameters to represent operational efficiency. Threads of the workload are reassigned to cores remaining active by assigning threads based on priority constraints and thread execution history to improve the operational efficiency of the multi-core architecture.

24 Claims, 6 Drawing Sheets

SYSTEMS AND METHODS FOR THREAD ASSIGNMENT AND CORE TURN-OFF FOR INTEGRATED CIRCUIT ENERGY EFFICIENCY AND HIGH-PERFORMANCE

GOVERNMENT RIGHTS

This invention was made with Government support under Contract No.: HR0011-07-9-0002 awarded by the Defense Advanced Research Projects Agency (DARPA). The Government has certain rights in this invention.

BACKGROUND

1. Technical Field

The present invention relates to integrated circuit management systems and more particularly to systems and methods which reduce energy usage and improve performance of integrated circuit processing cores especially during low utilization periods.

2. Description of the Related Art

Modern microprocessor architecture trends indicate increased numbers of cores—each core running multiple threads on a same chip. The elevated complexity of the on-chip resources as well as fluctuations in the application demand generates a significant resource management challenge, especially in terms of energy efficiency and performance. Recent studies on data server workload characteristics indicate that long periods of low utilization are common in data centers, such as, web servers, video/news-on-demand applications, banking centers etc.

During these low utilization periods, the data centers still require active chips to perform needed tasks. This results in a large power draw even though the full functionality of the component integrated circuits is not needed.

SUMMARY

Resource optimization can benefit even the highly utilized systems in terms of performance and energy efficiency. Energy efficiency and performance can be optimized using techniques described herein. The energy efficiency and relative performance within a core or in an SMT setting is relatively low during the low utilization periods. To serve the tasks in a job queue, a server chip still needs to stay active—even if the number of tasks is significantly lower than the full capacity.

In accordance with the present principles, systems and methods are provided that improve the energy efficiency and/or performance of servers at low utilization periods through task assignment and turning off cores. The present principles can benefit the energy efficiency and performance during all periods of operation, e.g., even during moderate-high utilization periods.

A system and method for improving efficiency of a multi-core architecture includes, in accordance with a workload, determining a number of cores to shut down based upon a metric that combines parameters to represent operational efficiency. Threads of the workload are reassigned to cores remaining active by assigning threads based on priority constraints and thread execution history to improve the operational efficiency of the multi-core architecture.

A system and method for improving efficiency of a multi-core architecture includes in accordance with a workload, determining a number of cores to shut down based upon a metric that combines parameters to represent operational efficiency based on a run-time sensor and hardware counters where information is processed simultaneously to identify problem threads and reassign threads without a profiling phase, and reassigning threads of the workload to cores remaining active by assigning threads based on priority constraints and thread execution history to improve the operational efficiency of the multi-core architecture.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
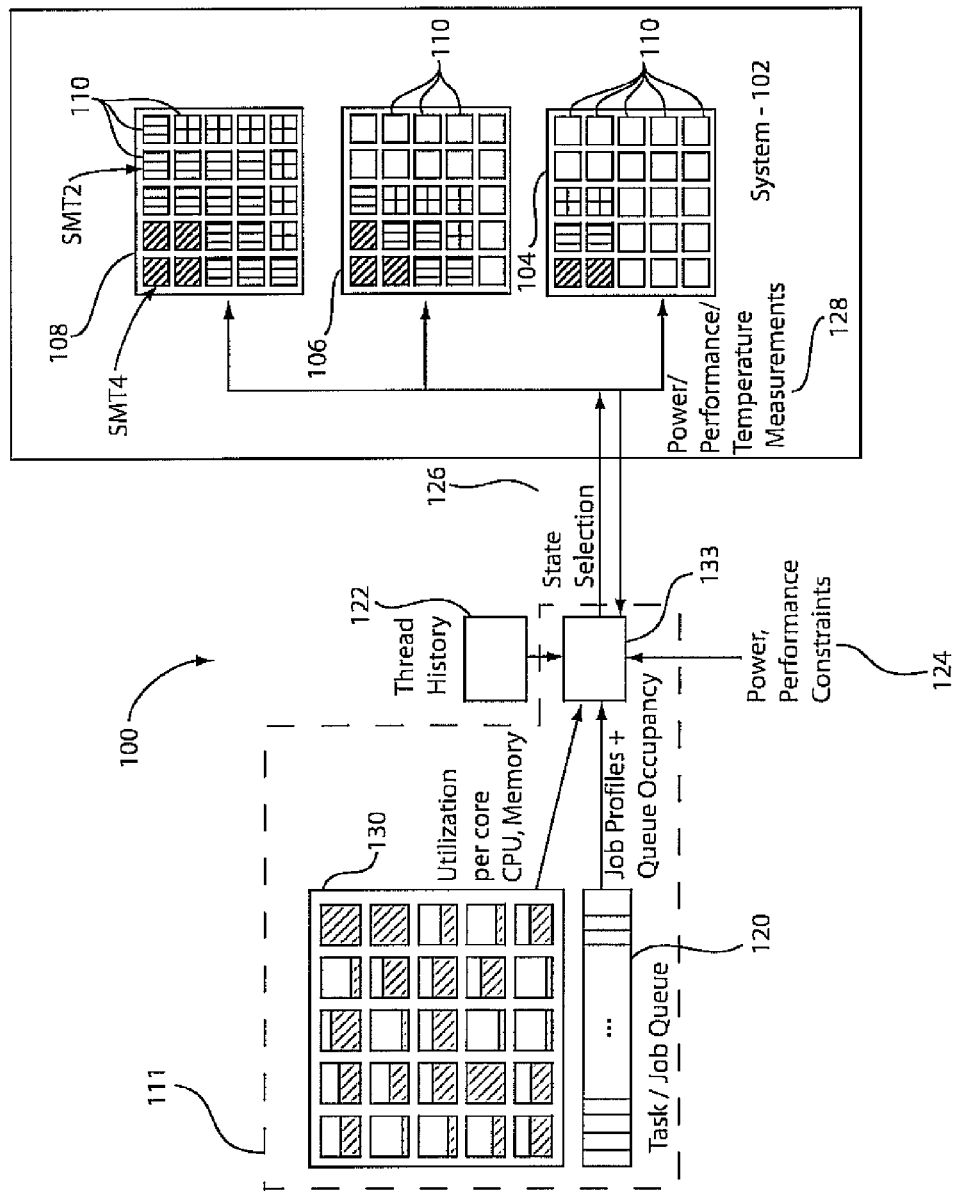
FIG. 1 is a block/flow diagram showing a core-shutdown and thread assignment system/method in accordance with one illustrative embodiment.

The present principles provide methods and systems for improving energy efficiency and performance of server architectures especially during low utilization periods by shutting down processing units and through hardware-aware thread reassignments. The present principles may be used even at high or moderate utilization periods.

In one embodiment, a core shut-down scheme includes one or more processing units/cores which are switched to an off state based on a metric (e.g., designated as "m" or "M"), which accounts for one or more of the following: core-level and chip-level utilization, number of threads in the task queue, memory accesses and power/performance constraints, ratio of dynamic power versus maximum power ($P_{dyn}/P_{max}$) per core and length of the low utilization period, etc. Other metrics may also be employed (e.g., temperature, etc.). The core scheme preferably gets activated during low utilization periods longer than a threshold "t" with a utilization level lower than 1 (e.g., 100%).

In another embodiment, core activation/deactivation may be provided based upon hardware or priority constraints. In one example, a multi-core shared level 2 (L2) architecture may include one or more cores from each node which are shut-down, whereas shared L2 caches may be kept active due to unique characteristics of the architecture. The threads are assigned to the remaining active cores in the node depending on priority and other constraints. The number of active core constraints may be relaxed for performance constraints. The active cores in the n-core node may provide increased L2 access (through interconnect configurations, partitioning priorities, etc.).

Simultaneous multi-threading (SMT) modes of the existing cores may be re-adjusted to compensate for the inactive cores. A scheduler along with a resource manager assigns SMT modes to cores according to the SMT flags of the existing threads in the queue and the above power/performance constraints. Each thread has a tag for SMT mode preference, depending on job priority, resource usage, memory access patterns, etc. for maximum efficiency.

In another embodiment, thread assignment and migration includes a minimum overhead thread assignment history table which enables leakage power and performance aware thread assignment to the cores by storing power dissipation, performance, memory accesses for thread combinations dynamically at run time from the existing thread combinations. Note that since there is no special profiling phase and dedicated cores, there is no computational overhead. The size of the thread assignment history table is minimized by storing the combinations with performance numbers below a predetermined threshold. This unwanted list stays active as long as the thread combinations remain in the task queue. As the threads are executed to completion, they are replaced with new combinations as the system adaptively learns the new combinations. The most wanted list is stored as well as the unwanted ("bad") list. The scheduler finds these threads in the queue and assigns them together.

This methodology employs an iterative scheme to isolate the threads which cause reduced throughput (by identifying the common threads in all unwanted list items as well as looking at available single thread performance, if possible). These threads are clustered and run on a minimum number of cores, and as a result, the overall system performance is improved.

In another embodiment, an instruction per cycle (IPC)-Hybrid scheme employs threads which are assigned according to the estimated single thread performance as well as a desired SMT mode. The thread assignment queue has corresponding bins for high to low performance threads. The thread scheduler assigns threads from respective queues giving priority to the assignment of high performance threads assigned together within the SMT constraints of the threads.

A simultaneous multi-threading 2 (SMT2) based performance analysis for threads may be performed. As a result, each thread is assigned a "thread friendliness" factor for SMT2. These numbers are used for extrapolating other SMT modes. The memory and CPU behavior are observed during these runs. Hence, the operating system assesses the qualities of the thread for future assignment. The threads are grouped into a memory log and specific resource contention classes (FP, FX, or other known instructions). The assignment is based on these simple thread qualities. High priority threads are assigned to high-performance cores due to process variability for maximum efficiency.

A thread is a sequence of tasks that can be performed by a processing core. In general, a thread is included inside a process, and different threads in the same process may share resources. Multithreading includes parallel execution of multiple tasks or threads where the processor or processing core switches between different threads. Operating systems support threading with a process scheduler. The operating system kernel permits programmers to manipulate threads via a system call interface.

Embodiments of the present invention can take the form of an entirely hardware embodiment, an entirely software embodiment or an embodiment including both hardware and software elements. In a preferred embodiment, the present invention is implemented in hardware, but may include software elements. Software elements may include but are not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks, modems, cable modem and Ethernet cards are just a few of the currently available types of network adapters.

The systems described herein may be part of the design for integrated circuits, chips or boards. The design of the systems, chips or boards are created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., Graphic Data System II (GDSII)) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips/boards can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multi-chip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Referring now to the drawings in which like numerals represent the same or similar elements and initially to FIG. 1, a core-shutdown and thread assignment system 100 is applied to a system 102 of chips, boards or other units to improve the performance and energy efficiency of multi-core architectures, especially during phases of low utilization. High-level execution of an illustrative system includes measuring current chip utilization of a plurality of chips 104, 106 and 108 in terms of characteristics such as, for example, power, performance, temperature, thread profiles, job queue utilization, job deadlines, etc. In a particularly useful embodiment, chip utilization characteristics include, e.g., a number of active threads in the job queue compared to the maximum capacity, dynamic power dissipation of cores compared to the maximum power (indicating high leakage power percentage) and length of low utilization mode.

Chips 104, 106 and 108 may be of the same type or different types, may be of any number and may each include cores implementing different SMT modes, e.g., ST, SMT, SMT2, SMT4, etc. it should be understood that the chips may be mounted on boards and may include systems on a chip, individual chips or any other circuit unit or components. In a particularly useful embodiment, the chips 104, 106 and 108 include processing cores 110. A processing core 110 may include a processor chip designed to handle computations and other tasks provided in a job queue of a scheduler 120.

A thread history table 122 is employed to track previous assignments of tasks on the cores 110 to extract performance characteristics of threads executed or performed by the cores 110. Power/performance constraints 124 are employed to make a state selection 126 and thread assignment decisions for the chips 104, 106, 108 and/or cores 110. On-chip power/performance and thermal measurements 128 (or other information) are collected periodically to assist the decision making process. This information is provided to a control module 133 which determines state selections for cores 110 and otherwise allocates core activity.

The thread history table 122 may include other information used in assignment decisions. For example, temperature information may be stored in the thread history table 122, such that threads can be assigned based on the resulting thermal profile of a combination of threads. For example, even if the thread combination yields high performance, the thread combination may not be desirable if the combination raises the temperature above a critical temperature threshold.

After a chip utilization program 130 is assessed in a computer processing unit (CPU) 111, a control module 133 reassigns the workload onto an active subset of cores. The activity of the cores 110 in FIG. 1 are indicated by different hatchings. The CPU 111 assesses utilization of the cores 110 from program 130 and inputs this information to the module 133. For illustrative purposes, those cores with different hatchings in FIG. 1 varying degrees of activity while those cores with no fill are inactive. Note that purely reassigning threads to the fewest number of cores 110 may result in significant performance degradation. Hence, the thread assignment is used to compensate for a potential performance drop. In certain cases, the overall performance may improve with the task assignment scheme. The number of active cores is calculated to match the overall chip utilization. The remaining cores are shut down or put into lower power states for leakage savings.

Assigning the threads to a fewer number of cores in simultaneous multi-threading may also cause performance degradation. The present methods, as implemented by module 133, perform thread clustering with minimum performance degradation onto a minimum number of cores as possible. During the thread assignment, thread characteristics are taken into consideration for performance.

The methods employed by module 133 may include but are not limited to the following. It should be understood that additional methods may be employed or these methods may be combined or alternately applied as needed.

In one embodiment, 1) Friendliness-based thread clustering: This is employed based on SMT analysis of the threads. For example, the SMT4 version has higher overhead due to the increased number of combinations it handles.

2) Pure IPC-based thread clustering: This may be employed where the high-IPC threads are clustered on a same core.

3) Hostile thread isolation: In this scheme, the threads with low performance potential in general are isolated, and they are assigned to special cores so that the remaining cores can achieve higher IPC.

4) Randomized-IPC hybrid: Assigns threads to a number of IPC bins, e.g., high/intermediate/low IPC. The assignment from within the bin is random, yet the scheme resembles the pure IPC scheme in terms of the higher level method steps.

5) IPC-Friendly hybrid: Unlike the pure IPC or pure friendly-threads based methods, this method only considers the symbiotic combinations with high IPC, the rest of the assignments are random.

6) Memory bound based scheme: assigns threads based on memory characteristics.

To reduce the analysis overhead in module 133, two bins may be employed for the IPC-Friendliness determination. These bins (e.g., good and bad) may be employed to separate threads based on high performance and memory intensity. By reducing the number of combinations, this improves the efficiency of assignment—yet provides benefits comparable to tracking all possible combinations.

The number of active cores at any point in time depends on the workload demand and power saving mode. In general, the present principles optimize the energy efficiency by matching the overall chip utilization to the percentage of active cores. Discrete settings of percentages, e.g., 25%, 50%, 75% and 100% for core activity is also a possible implementation/embodiment. These setting percentages may be applied to the chip (104, 106 or 108) or applied to individual cores 110.

In accordance with the present principles, power/performance trade-offs in different SMT modes and multi-threading modes are employed as a "power knob" to control the core activity. The simultaneous multi-threading mode (single thread (ST), SMT2, SMT4, etc.) affects the energy efficiency according to our experimental analysis.

Module 133 sets different cores 110 on a processor or system 102 to different operation modes depending on the power saving mode and the application demand. Some cores 110 are over-clocked to compensate for the performance degradation in the inactive cores, while others may be put into power saving modes. By employing the heterogeneity in the applications and the core performance (e.g., SMT mode and power saving mode) both performance and energy may be optimized simultaneously.

Optimization may be performed using an objective function to compare different scenarios in module 133. The best case scenario may be selected or a scenario that meets particular constraints may be selected. For example, cores in single-thread (ST) mode may be used for threads with single-thread high performance requirements as well as deadline restrictions. Higher levels of multi-threading may be used for threads which do benefit from SMT or do not have strict deadline restrictions—as well as deeper power saving modes.

In accordance with the present principles, module 133 and system 100 may be implemented in software with hardware assistance. System 100 may be employed as an operating system scheduler or may be employed as a separate system for monitoring and controlling processing systems and multi-core processors.

Figure 2:
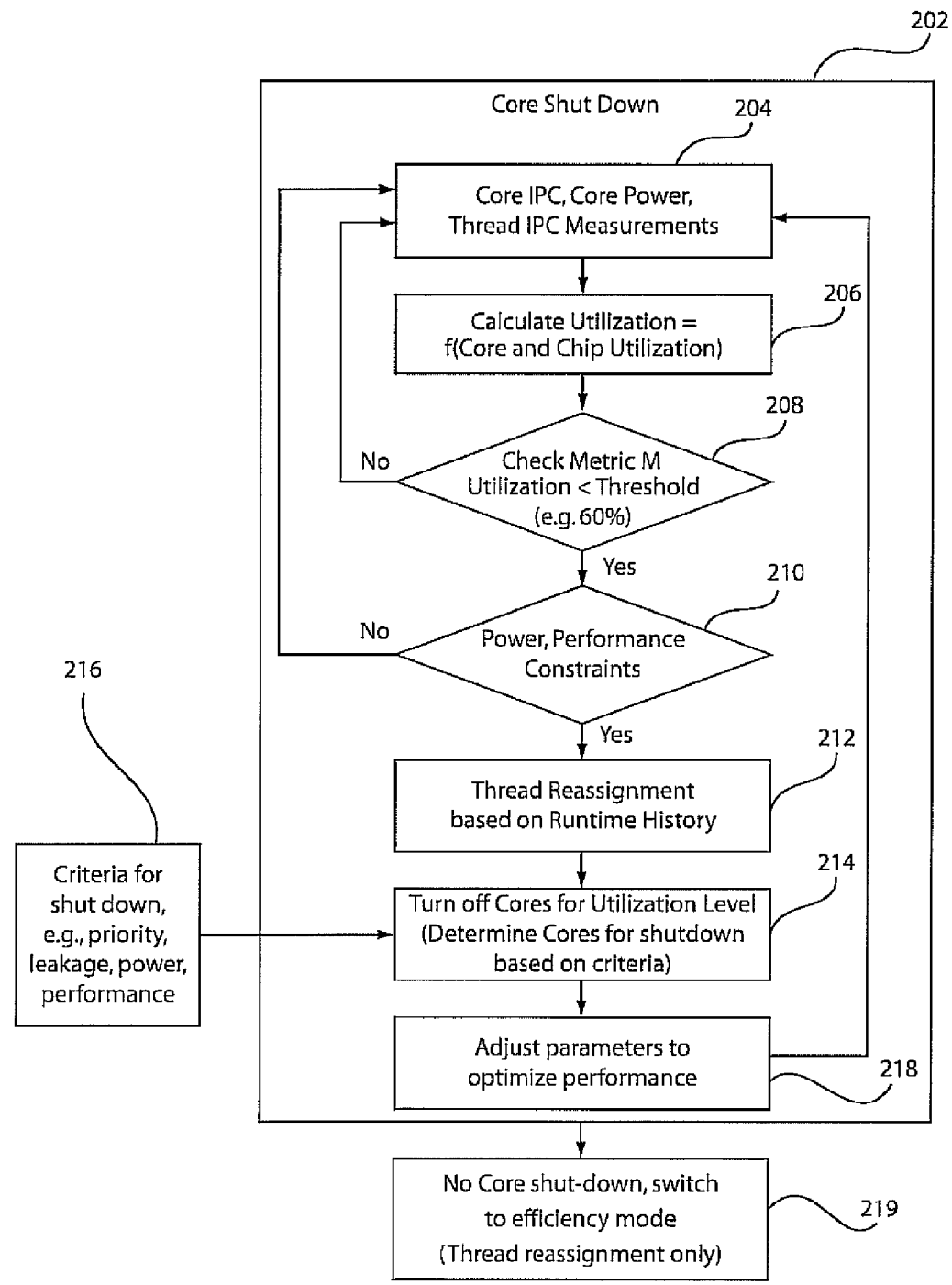
FIG. 2 is a block/flow diagram showing a core-shutdown system/method in accordance with one illustrative embodiment.

Referring to FIG. 2, a system/method for improving energy efficiency of server architectures or multi-core processors, especially during low utilization periods is illustratively shown. The system/method includes selectively shutting down processing units/cores and hardware-aware thread reassignments. The method/system is preferably implemented by module 133 with inputs as depicted in FIG. 1, and may be employed during regular operation to monitor and optimize core usage. The system/method may be triggered under present system operating conditions. For example, the method gets activated during low utilization periods longer than a threshold period with a utilization level lower than 1 (100%). Other criteria may also be employed.

In block 202, core shut-down operations are described. In block 204, core evaluation is performed by gathering information or taking measurements on utilization, power and performance of each core. This information may include the IPC of each core, core power, temperature and thread IPC measurements under given conditions. These values may be initialized to a set value and updated during the execution of the method as will be described.

The method has special modes for power and performance caps. While we are trying to improve the efficiency of the chip, we are still bound by the power and performance caps and similar restrictions—which affect the way the methods run in these modes. These may be checked in block 206. In block 206, utilization is computed or updated as a function of core and or chip utilization. This function may be based on the design of the chip or core or based on performance metrics of the like. The utilization is preferably expressed as a percentage.

In block 208, a comparison between a threshold and the utilization is made. The threshold may be a user selected or dynamically computed based on the application or conditions. If the utilization is not less than the threshold, the program path returns to block 204. The utilization parameters are periodically updated. This preferably includes a check of the metric M.

If the utilization is less than the threshold, the program path goes to block 210, where a determination of whether power, or performance constraints exist that can be applied. If yes, then in block 212, thread reassignment based upon runtime history is applied. If no constraints exist, then the program path returns to block 204.

In block 214, one or more processing units/cores (or other devices, e.g., caches) are switched to an off state based on the metric, M. For example, M may be computed as:

M=alpha_stat*Power_management_mode*[C1*(Σ(Pdyn_core/Pmax_core)/Number of Cores)+C2*(Number of High_Priority_Threads/Threshold1+Total_Number_of_threads/Full_Capacity_of_Tasc_Queue)+1/C3*(NumberofMemoryAccess/Preset_Memory_Access_Threshold)++C4*(Target_Throughput/Preset_Threshold)+1/C5*(Average chip temperature−Temp_Threshold)/Nominal_target_avg_temp]; where alpha_stat is an experimental constant (static) based on number of cores, and hardware settings (to offset redundant shut-downs); C1-Cn are computational weights (set by the operating system/hypervisor/hardware settings and priority settings); power_management_mode is a dynamic value provided by the power management mode (if the chip is in high power management mode, the core shut down is more aggressive). The other variables in this example have self-explanatory labels.

The metric M is compared to preset values (M1-MN). Depending on the outcome (what range M falls in M1-MN):
(1) One-or more cores are shut down depending on the utilization;
(2) Core SMT (simultaneous multithreading mode) is changed depending on the utilization;
(3) One or more cores change Voltage and Frequency Settings (a) To reduce power dissipation of the inactive cores reduce the voltage/frequency (b) To increase the performance of the active cores increase supply voltage, clock frequency of the active cores;
(4) Guarantee pre-determined number of cores to be active for each M and C2*(number of high priority threads/Thread Queue capacity).

Other consideration may also be employed.

Then the scheme shuts down a number of (0-N) cores (e.g., based on the above). To shut down cores priority may be based on temperature and high temperature cores are shut down first, while keeping low temperature cores active.

The metric M may be computed based upon an objective function that evaluates and weights of different parameters that affect efficiency and performance. For example, M may account for one or more of the following criteria, in block 216: core-level and chip-level utilization, number of threads in a task queue, memory accesses and power/performance constraints, ratio of $P_{dyn}/P_{max}$ per core, temperature, leakage profile, length of the low utilization period, etc.

A plurality of shut-down methods may be applied to conserve power and improve efficiency. These methods employ adjustment of parameters to improve performance of remaining active cores in block 218. For example, in a multi-core shared level 2 (L2) architecture: one or more cores from each node are shut-down, whereas the shared L2 caches are kept active due to unique characteristics of the architecture. Threads are assigned to remaining active cores in the node and depending on priority constraints to the neighboring nodes. The number of active core constraints may be relaxed for performance constraints.

A number of options may be provided when shutting down cores. For example, in a case of shared caches, the cache structures are not shut down every time the cores are off. Instead, tracking of how the threads use caches is employed to decide how many caches need to be shutdown.

In accordance with the example, the active cores in the n-core node may be provided increased L2 access (through interconnect configurations, and/or partitioning priorities). This is to enable more efficient utilization of the active cores to permit the shut down of less active cores to improve efficiency. Other steps may also be taken to improve performance, for example, a clock frequency and supply voltage may be increased to provide a performance boost for the active cores and to compensate for the shut down of inactive cores. If all cores are inactive in the n-core node, the shared L2 cache can be brought to a leakage saving state with data retention to preserve the stored memory.

Criteria for shut down in block 216 may include that the cores with higher leakage power due to variability are given higher priority for shut-down to alleviate the variation characteristics of the current process technologies. The cores with high temperatures with or without variability are given priority for shut-down due to the higher power savings. SMT modes of the existing cores are re-adjusted in block 218 to compensate for the inactive cores. A scheduler along with a resource manager, which may be present in module 133, may be configured to assign SMT modes to cores according to SMT flags of existing threads in the queue, and the above power/performance constraints. Each thread may have a tag for an SMT mode preference, depending on the job priority, resource usage, memory access patterns etc for maximum efficiency. After deactivating cores, the program path returns to block 204 and repeats to update the core/chip utilization in accordance with the present principles.

In block 219, if no cares are shut down, an efficiency mode may be initiated to improve system function. For example, only thread reassignment may be employed in accordance with the present principles.

Figure 3:
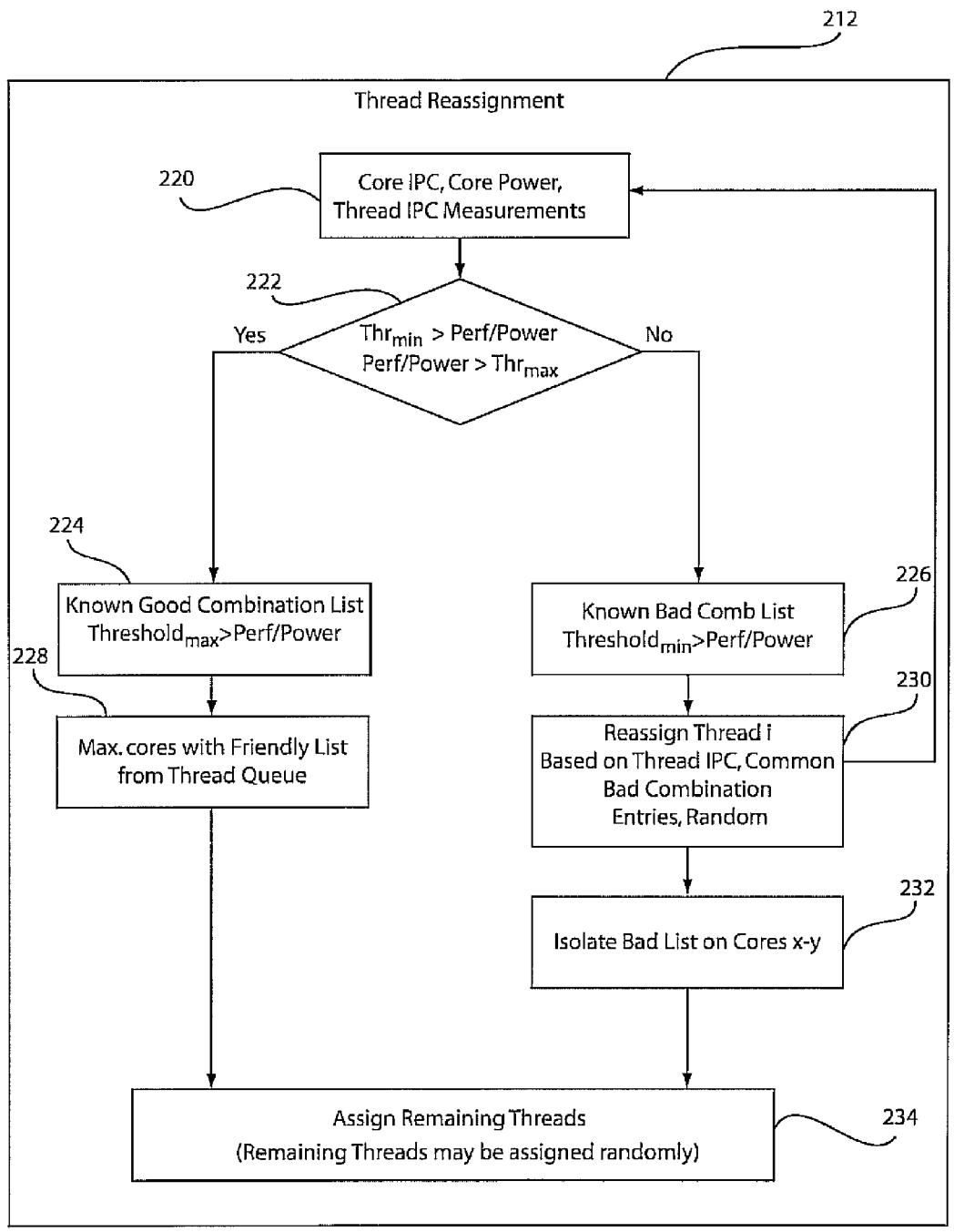
FIG. 3 is a block/flow diagram showing a thread assignment system/method in accordance with one illustrative embodiment.

Referring to FIG. 3, a thread assignment and migration system/method 212 is illustratively shown. Thread reassignment is employed as part of FIG. 2, but may be employed separately as a method for performance enhancement of a multi-core system. In block 220 (similar to block 204), core evaluation is performed by gathering information or taking measurements on utilization, power, priority and performance of each core. This information may include the IPC of each core, core power, thread IPC measurements under given conditions, temperature, etc. These values may be initialized to a set value and updated during the execution of the method. These values may be inherited from block 204 of FIG. 1.

In block 222, for each thread combination, power, performance, utilization, priority or other metrics may be compared to a minimum threshold ($Thr_{min}$) and compared to a maximum threshold ($Thr_{max}$). These thresholds may be set based upon desired performance criteria, power criteria or other parameter criteria. The threshold may be determined by a user or based on some function or other constraint. In one example, thread priorities add another dimension to the thread-reassignment schemes. For example, the threads with high priorities and strict deadline restrictions are not assigned to cores running in SMT4 mode. This may also be employed as another item tracked for making a core shut down decision.

If the parameter is less than the $Thr_{max}$, the thread combination is checked against a known good combination list in block 224. In block 228, a number of cores are maximized which are assigned threads from the good combination list. This type of thread combination from the thread queue may be referred to as friendly or compatible.

If the parameter is less than the $Thr_{min}$, and the thread combination is on a known bad combination list in block 226, the thread or threads are reassigned in block 230. The reassignment may be based on thread IPC, a known bad combination (switch to a better combination), random reassignment, etc. In one embodiment, the bad listed threads or thread combinations are isolated to particular cores to improve performance in block 232. In block 234, remaining threads are assigned. This may be performed randomly or based upon design criteria of the system or application.

The thread assignment can also be used for increasing the efficiency of a multi-core architecture at high utilization periods, where no core shut-down is necessary. The present principles may cover regular management of threads; not just in situations when the threads get reassigned for core shut-down cases.

Figure 4:
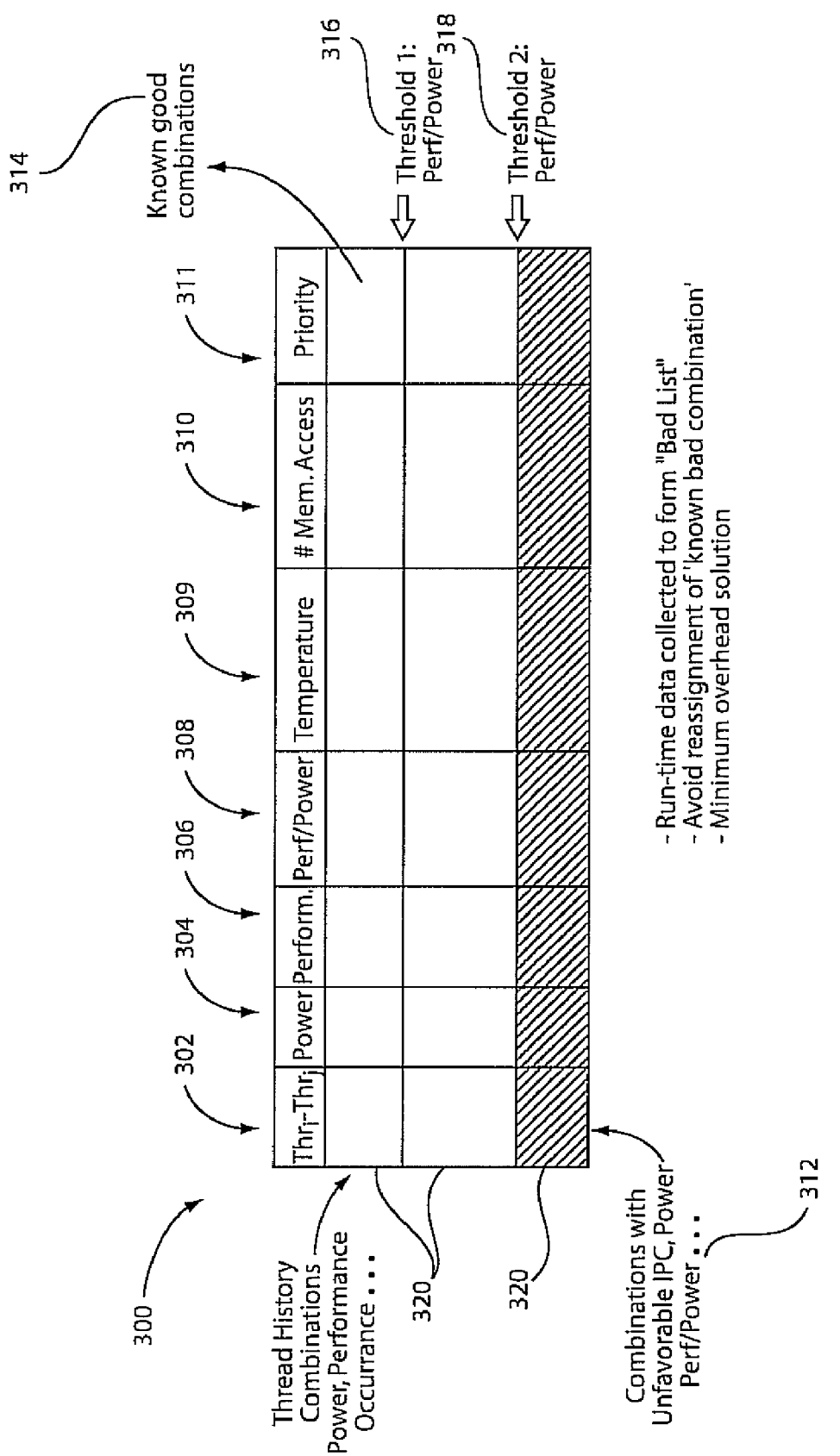
FIG. 4 is a thread history table in accordance with one illustrative embodiment.

Referring to FIG. 4, an illustrative thread assignment history table 300 (or 122) is shown. Table 300 is preferably configured to have minimum overhead/costs (based on memory, power, etc.). Thread assignment history table 300 enables leakage, power, temperature, priority and performance aware thread assignment to the cores by storing power dissipation, performance, memory accesses for thread combinations dynamically at run time from the existing thread combinations. Since there is no special profiling phase and dedicated cores, there is no computational overhead. Since no special profiling phase is employed, the thread table is dynamically filled in real-time when the system is running.

The size of the thread assignment history table is minimized by storing the combinations with performance numbers below a pre-determined threshold. This unwanted or bad list stays active as long as the thread combinations remain in the task queue. As the threads are executed to completion, they are replaced with new combinations—as the system adaptively learns the new combinations. The most wanted list or good combination list is stored as well as the unwanted list or bad combination list. The scheduler finds these thread types in the queue and assigns them in accordance with constraints for improving performance.

This is performed by iteratively reviewing the thread combinations in the history table 300 and isolating the threads which cause reduced throughput (by identifying the common threads in all unwanted list items as well as looking at available single thread performance, if possible). These threads are cluster run on a minimum number of cores, and as a result, the overall system performance is improved.

The thread history table 300 may include an area 302 which identifies thread pairs (e.g., $Thr_i$-$Thr_j$). In area 304, power information for the given pair is provided. In area 306, performance information for the given pair is provided. In area 308, a combined parameter, e.g., performance/power is provided. In area 309, temperature information may be stored in the thread history table. Temperature information may be stored in the thread history table such that threads can be assigned based on the resulting thermal profile of a combination of threads. For example, even if the thread combination yields high performance, the thread combination may not be desirable if the combination raises the temperature above a critical temperature threshold.

In area 310, a number of memory accesses is provided for the given pair of threads. In area 311, priority information may be provided. In one example, thread priorities may add another dimension to the thread-reassignment. For example, the threads with high priorities and strict deadline restrictions are not assigned to cores running in, say, SMT4 mode. This may also be employed as another item tracked for making a core shut down decision.

The table 300 ranks these parameters in accordance with a formula, which may include weighting factors for each parameter. So, for example, in one embodiment, performance may be employed to rank the thread pairs, in another embodiment, it may be a combination of parameters, e.g., performance/power. In addition, threads or thread pairs may be assigned a priority, which may be incorporated in the ranking methodology. In still another embodiment, all or a subset of the parameters may be combined in a formula to determine the rank of the thread pairs.

Data on thread history may be updated as the thread pair is assigned and executed to build the table 300 with thread history based on information on thread combinations, power, performance, number of occurrences and the like for the thread pairs and/or threads. Combinations with unfavorable IPC, power, performance/power, etc. move to a bad or unwanted combination list 312. Known good combinations move to a good combination list 314. The two lists are separated by set criteria. In this example, a threshold 1 (316) and a threshold 2 (318) designate the lists. The thresholds correspond to $Thr_{min}$ and $Thr_{max}$ as described above. In this example, the thresholds are for comparison with the performance/power parameter. However, any parameter or combination of parameters may be employed.

The ranking or positioning of the threads or thread pairs in the table 300 may be weighted or performed in accordance with a plurality of policies or constraints. The following is a non-limiting description of a few illustrative schemes for reassigning threads in accordance with the present principles.

In an IPC-Hybrid Scheme, threads are assigned according to an estimated single thread performance as well as a desired SMT mode. The thread assignment queue/table 300 has corresponding bins 320 for high to low performance threads. A thread scheduler (not shown) assigns threads from respective queues giving priority to the assignment of high performance threads assigned together within the SMT constraints of the threads.

SMT2 based performance analysis for threads may be employed, and as a result each thread is assigned a thread friendliness factor for SMT2. These numbers are used for extrapolating other SMT modes. The memory and CPU behavior can be observed during these runs; hence, the operating system assesses the qualities of the thread for future assignment. The threads are grouped into a memory log and specific resource contention classes (FP, FX, etc). The assignment is based on these simple thread qualities. High priority threads are assigned to high-performance cores (110) due to process variability for maximum efficiency.

Other schemes may be employed for thread reassignment policies. The reassignments may include specific cores or random cores to improve performance. Advantageously, the core management embodiments described herein provide multiple degrees of freedom in which to more efficiently improve power and performance of a system. Such degrees include activation/deactivation of one or more cores, adjustment the utilization of one or more cores, reassigning threads, adjusting the type of threads run (adjusting multithreading modes), designating particular threads to run on particular cores, and any combinations of these.

Figure 5:
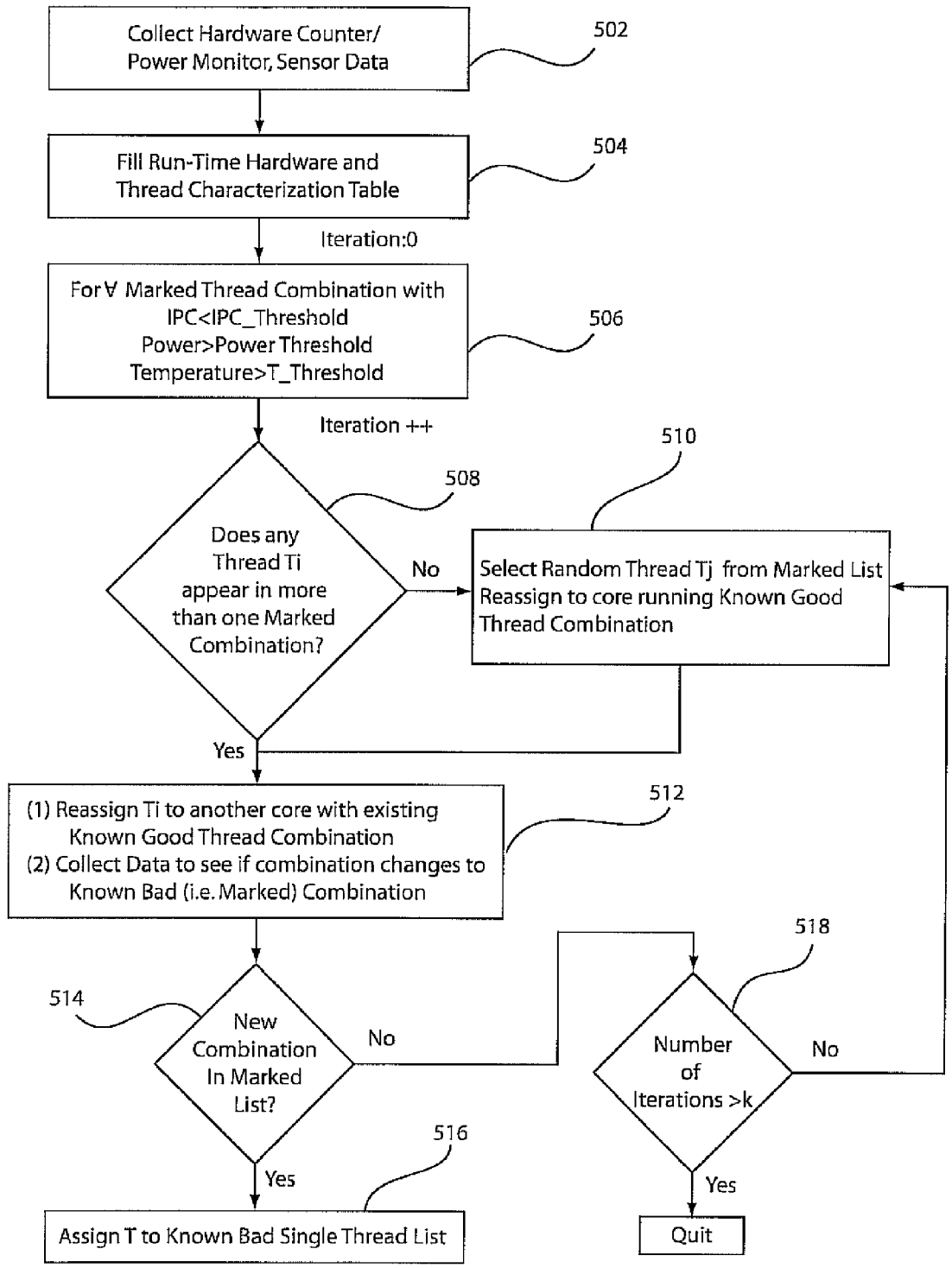
FIG. 5 is a block/flow diagram showing a thread assignment system/method in accordance with another illustrative embodiment.

Referring to FIG. 5, a system/method in accordance with another illustrative embodiment is shown. In block 502, data from one or more of a sensor, a hardware counter and a power monitor (power dissipation data) are collected. In block 504, run-time characterization tables (FIG. 4) are updated according to the information collected in block 502. The data may be collected for an entire chip, a processing core, a functional unit, a thread combination, or on an individual thread basis. Note that the data for the characterization table is not generated through dedicated runs, such as test runs or profiling runs. Instead, the data is collected through a normal operation period; hence, there is no additional profiling overhead associated with filling/updating the tables. Additional processing of the table data may be employed to extract the useful data out of the regular runs—without specialized profiling runs.

The size of the characterization table is minimized by storing only significant thread combinations in terms of power, performance or temperature (e.g., in both best and worst performing edges of the spectrum). In block 506, values stored in the characterization table are checked at run time. The method scans through the list of worst performing thread combinations (e.g., the marked list). The instructions per cycle (IPC), power and temperature as measured are compared with thresholds.

Because there is no dedicated profiling phase, the method does not know which thread or threads (Ti) are causing the marked thread combination's unfavorable characteristics. The list of marked combinations is gone through, and common threads that appear in more than one marked combination are found in block 508. In blocks 512, the method starts reassigning the common elements to other dedicated cores to identify if that particular thread is causing the problem. This includes reassigning the thread to another core with known performance and/or collecting data to note changes to a marked combination. If the thread is not in a marked combination, random threads may be selected and assigned to cores running known good combinations of threads in block 510.

In block 514, based on the collected data, a determination as to whether the thread or combination should be added to the marked list is made. If yes, the thread is assigned to the bad thread list in block 516.

In block 518, a number of iterations may be performed to finish all the common threads in the marked list. If there is no thread identified as unfriendly, the program moves one thread randomly to a different core in block 510. If the resulting combination is out of the marked list, this indicates that the thread was using most of the resources ineffectively and hence disturbing the power efficiency of the system. If no thread exhibits the aforementioned qualities, the method quits after a predetermined number (k) of iterations and continues with random thread assignment schemes.

Figure 6:
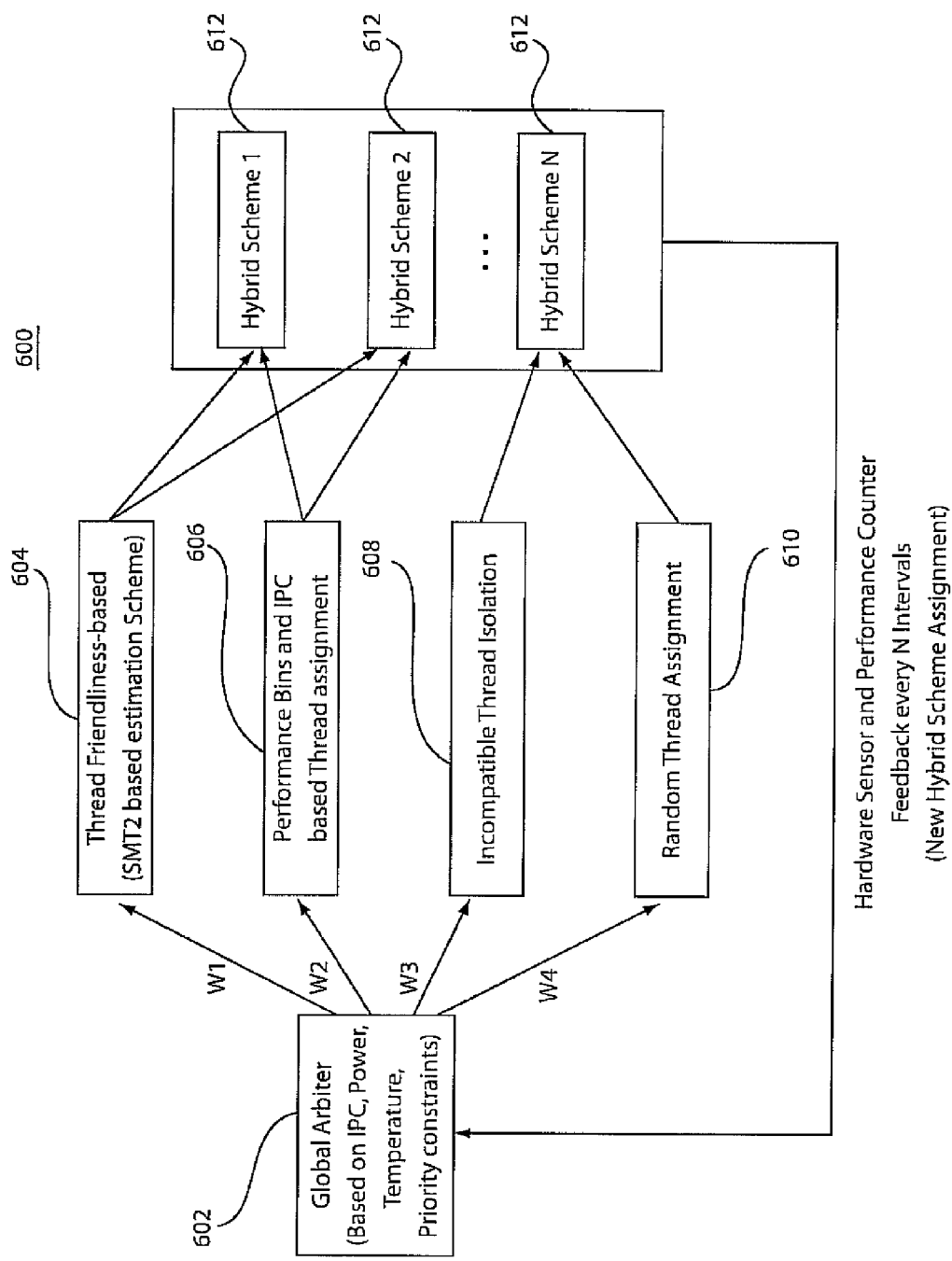
FIG. 6 is a block/flow diagram showing a thread assignment selection system/method in accordance with one illustrative embodiment.

Referring to FIG. 6, a system/method 600 with a global arbiter 602 and thread assignment scheme selection are depicted. The global arbiter 602 makes a thread assignment method selection based on a number of parameters including, but not limited to: performance measured in throughput and IPC, power dissipation, functional unit level hotspot temperatures, priority constraints, power saving modes, etc. The arbiter 602 then selects from a number of base methods, each with different power/performance efficiency characteristics. The arbiter 602 assigns different weights to the methods to achieve hybrid schemes 612 depending on the power/performance characteristics.

For example, a first scheme 604 is based on thread friendliness, where the threads are assigned based on the compatibility of resource usage and requirements. A second scheme 606 is based on the performance characteristics of the threads (estimated from run-time characterization table). The threads are assigned to high/medium/low performance bins. A third scheme 608 isolates the threads with high resource requirements (which degrades the performance of the threads that they are assigned with). A fourth scheme 610 assigns threads randomly.

The global arbiter 602 assigns weights (W1-W4) to the four schemes to form hybrid schemes 612 to meet the power/performance/temperature constraints. The process repeats and decisions are remade in periodic intervals, e.g. every N cycles. The hybrid schemes 612 may be customized in accordance with the weights.

Having described preferred embodiments for systems and methods for thread assignment and core turn-off for integrated circuit energy efficiency and high-performance (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for improving efficiency of a multi-core architecture, comprising:
 in accordance with a workload, determining a number of cores to shut down based upon a metric that combines parameters to represent operational efficiency based on a run-time sensor and hardware counters where information is processed simultaneously to identify problem threads without a profiling phase; and reassigning threads of the workload to cores remaining active by assigning threads based on priority constraints and thread execution history to improve the operational efficiency of the multi-core architecture, where the reassigning includes assigning a combination of the threads of the workload that are executed on at least one core selected for shut down to one of the cores remaining active in response to determining from the thread execution history that the combination of threads is a compatible combination based on performance of the combination of threads.

2. The method as recited in claim 1, wherein the operational efficiency is determined by measuring one or more of core-level utilization, chip-level utilization, a number of threads in a task queue, temperature, power constraints, performance constraints, a ratio of powers ($P_{dynamic}/P_{maximum}$) per core and a length of a utilization period.

3. The method as recited in claim 1, further comprising activating the method during a utilization period longer than a time threshold with a utilization level lower than 100%.

4. The method as recited in claim 1, wherein assigning threads based on priority constraints includes assigning threads based upon knowledge of hardware such that devices that need to be kept active are given a higher priority.

5. The method as recited in claim 1, wherein determining a number of cores to shut down includes determining cores to be shut down based upon priority constraints.

6. The method as recited in claim 1, further comprising adjusting operational parameters to optimize performance.

7. The method as recited in claim 1, further comprising adjusting single thread (ST) and simultaneous multi-threading (SMT) modes of the cores to compensate for inactive cores.

8. The method as recited in claim 1, wherein reassigning threads includes assigning threads to the remaining cores based on a thread history table which stores measurement information for previous thread assignments.

9. The method as recited in claim 8, wherein the thread history table stores measurement information for previous thread assignments including one or more of power dissipation, performance, temperature and memory accesses for thread combinations dynamically at run time from existing thread combinations.

10. The method as recited in claim 8, wherein the thread history table includes at least one threshold to differentiate between threads with preferred characteristics and threads with unpreferred characteristics such that assignment priority is given to the threads with preferred characteristics.

11. A non-transitory computer readable medium comprising a computer readable program for improving efficiency of a multi-core architecture, wherein the computer readable program when executed on a computer causes the computer to perform the steps of:

in accordance with a workload, determining a number of cores to shut down based upon a metric that combines parameters to represent operational efficiency based on a run-time sensor and hardware counters where information is processed simultaneously to identify problem threads without a profiling phase; and reassigning threads of the workload to cores remaining active by assigning threads based on priority constraints and thread execution history to improve the operational efficiency of the multi-core architecture, where the reassigning includes assigning a combination of the threads of the workload that are executed on at least one core selected for shut down to one of the cores remaining active in response to determining from the thread execution history that the combination of threads is a compatible combination based on performance of the combination of threads.

12. A method for improving efficiency of a multi-core architecture, comprising:

in accordance with a workload, determining a number of cores to shut down based upon a metric that combines parameters to represent operational efficiency, and based upon priority constraints of the cores; and reassigning threads of the workload to cores remaining active by assigning threads based on priority constraints and thread execution history to improve the operational efficiency of the multi-core architecture, including:

adjusting single thread (ST) and simultaneous multi-threading (SMT) modes of the cores to compensate for inactive cores; and assigning a combination of the threads of the workload that are executed on at least one core selected for shut down to one of the cores remaining active in response to determining from the thread execution history that the combination of the threads is a compatible combination based on performance of the combination of the threads.

13. The method as recited in claim 12, wherein the operational efficiency is determined by measuring one or more of core-level utilization, chip-level utilization, a number of threads in a task queue, memory accesses, temperature, power constraints, performance constraints, a ratio of powers ($P_{dynamic}/P_{maximum}$) per core and a length of a utilization period.

14. The method as recited in claim 12, further comprising activating the method during a utilization period longer than a time threshold with a utilization level lower than 100%.

15. The method as recited in claim 12, wherein assigning threads based on priority constraints includes assigning threads based upon knowledge of hardware such that devices that need to be kept active are given a higher priority.

16. The method as recited in claim 12, further comprising adjusting operational parameters to optimize performance.

17. The method as recited in claim 12, wherein the thread history table stores measurement information for previous thread assignments including one or more of power dissipation, performance, and memory accesses for thread combinations dynamically at run time from existing thread combinations.

18. The method as recited in claim 12, wherein the thread history table includes at least one threshold to differentiate between threads with preferred characteristics and threads with unpreferred characteristics such that assignment priority is given to the threads with preferred characteristics.

19. A system for improving efficiency of a multi-core architecture, comprising:

a processor including:

a scheduler and run-time data collection based hardware and thread characterization table such that the scheduler is configured to schedule a computational workload of tasks for the multi-core architecture, the multi-core architecture including at least one chip having a plurality of cores; and a control module configured to allocate core activity and assign threads in accordance with the scheduler and one or more of constraints, thread history and measurements from the multi-core architecture such that in accordance with the workload, a number of cores are shut down based upon a metric that combines parameters to represent operational efficiency and threads of the workload are reassigned to cores remaining active by assigning a combination of the threads of the workload that are executed on at least one core selected for shut down to one of the cores remaining active in response to determining from a thread execution history that the combination of the threads is a compatible combination based on performance of the combination of the threads to improve the operational efficiency of the multi-core architecture.

20. The system as recited in claim 19, wherein the operational efficiency includes a measure of one or more of core-level utilization, chip-level utilization, performance measurement per thread per core and chip, a number of threads in a task queue, memory accesses, on-chip peak block temperatures, power constraints, performance constraints, a ratio of powers ($P_{dynamic}/P_{maximum}$) per core and over the chip and the length of a utilization period.

21. The method as recited in claim 19, wherein the threads of the workload are reassigned to cores remaining active based upon at least one of knowledge of hardware such that devices that need to be kept active are given a higher priority.

22. The system as recited in claim 19, wherein the threads of the workload are reassigned to cores remaining active based upon adjusting single thread (ST) and simultaneous multi-threading (SMT) modes of the cores to compensate for inactive cores.

23. The system as recited in claim 19, further comprising a thread history table which stores measurement information for previous thread assignments, wherein the thread history table includes at least one threshold to differentiate between threads with preferred characteristics and threads with unpreferred characteristics such that assignment priority is given to the threads with preferred characteristics.

24. The system as recited in claim 23, wherein the thread history table stores measurement information for previous thread assignments including one or more of power dissipation, performance, and memory accesses for thread combinations dynamically at run time from existing thread combinations.

* * * * *